(12) United States Patent
Heikinheimo

(10) Patent No.: US 8,391,850 B2
(45) Date of Patent: *Mar. 5, 2013

(54) METHOD FOR FORMING AN AUDIOVISUAL CALL IDENTIFIER, A MOBILE COMMUNICATION DEVICE AND A CALL IDENTIFIER

(75) Inventor: Hanna Heikinheimo, Espoo (FI)

(73) Assignee: Manor Research, L.L.C., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/231,910

(22) Filed: Sep. 13, 2011

(65) Prior Publication Data

US 2012/0064872 A1   Mar. 15, 2012

Related U.S. Application Data

(63) Continuation of application No. 11/664,372, filed as application No. PCT/FI2005/050316 on Sep. 14, 2005, now Pat. No. 8,045,968.

(30) Foreign Application Priority Data

Oct. 1, 2004  (FI) .................................... 20041277

(51) Int. Cl.
    *H04M 3/42*  (2006.01)
(52) U.S. Cl. ................. 455/415; 455/412.1; 455/412.2; 455/413; 455/146; 455/417; 379/142.01; 379/142.08; 379/88.08; 379/142.1; 379/142.11
(58) Field of Classification Search .... 455/412.1–412.2, 455/413–417; 379/142.01–142.09, 142.1, 379/142.11, 88.21–88.27
See application file for complete search history.

(56) References Cited

U.S. PATENT DOCUMENTS

| | | | |
|---|---|---|---|
| 6,775,463 | B1 | 8/2004 | Nooralahiyan et al. |
| 2003/0001882 | A1 | 1/2003 | Macer et al. |
| 2003/0100295 | A1 | 5/2003 | Sakai et al. |
| 2004/0121818 | A1 | 6/2004 | Paakkonen |
| 2008/0261575 | A1 | 10/2008 | Heikinheimo |

FOREIGN PATENT DOCUMENTS

| | | |
|---|---|---|
| EP | 1033857 A2 | 9/2000 |
| EP | 1117245 A1 | 12/2000 |
| EP | 1202536 | 5/2002 |
| FR | 2860942 | 4/2005 |
| JP | 2002247206 | 8/2002 |
| JP | 2004201249 | 7/2004 |
| JP | 2004228755 | 8/2004 |
| JP | 2004274494 | 9/2004 |
| KR | 20030056467 | 7/2003 |
| WO | 0079770 | 12/2000 |
| WO | 04056073 | 12/2003 |
| WO | 2004054278 | 6/2004 |
| WO | 2006037850 | 4/2006 |

OTHER PUBLICATIONS

National Board of Patents and Registration of Finland; International Search Report and Written Opinion PCT/FI2005/050316; Nov. 14, 2006; 11 pages.
English translation abstract; JP 2004-214915; Yamaha Corp.; Published Jul. 29, 2004; 1 page.
English translation abstract; JP 2002-064658; Venture Matrix Inc.; Published Feb. 28, 2002; 1 page.

*Primary Examiner* — Wayne Cai
(74) *Attorney, Agent, or Firm* — Stolowitz Ford Cowger LLP

(57) ABSTRACT

Disclosed is an audiovisual call identifier including image and sound for a mobile communication device. The call identifier is shown on the display and audibly reproduced through the loudspeaker when a call is received by the communication device.

23 Claims, 2 Drawing Sheets

Figure 1:
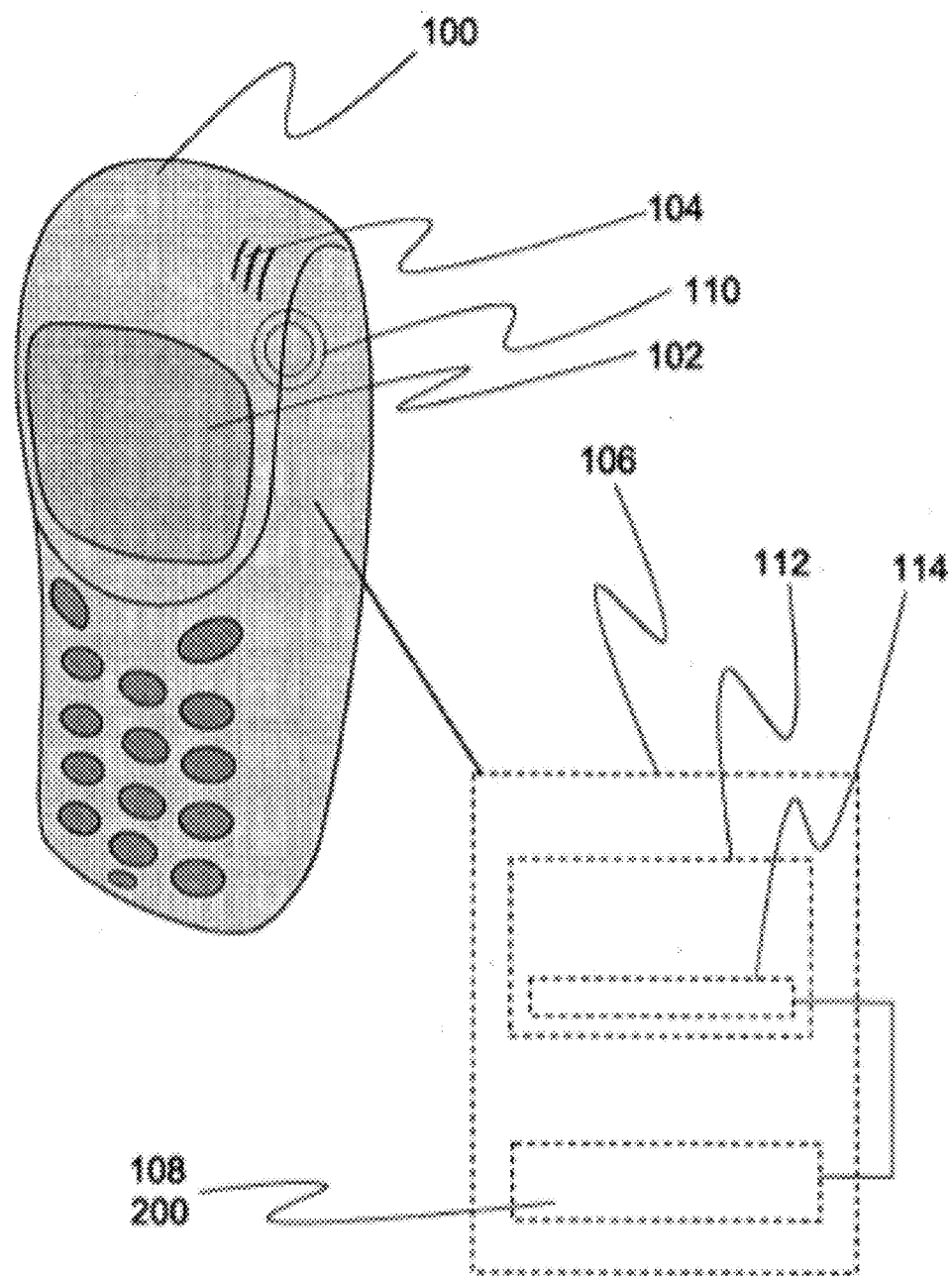

METHOD FOR FORMING AN AUDIOVISUAL CALL IDENTIFIER, A MOBILE COMMUNICATION DEVICE AND A CALL IDENTIFIER

This application is a continuation of and claims priority to U.S. patent application Ser. No. 11/664,372, filed Feb. 11, 2008, now U.S. Pat. No. 8,045,968, issued Oct. 25, 2011, which is a national phase application under 37 C.F.R. §371 of Patent Cooperation Treaty application PCT/FI2005/050316, filed Sep. 14, 2005, which claims priority to Finish application 20041277, filed Oct. 1, 2004, all of which are incorporated herein in their entirety.

The invention relates to a method for forming an audiovisual call identifier in a mobile communication device. The invention also relates to a mobile communication device and an audiovisual call identifier.

Various ring tones, from which the user can select the one desired, have usually been saved in the memory of the mobile phone by the manufacturer. Most mobile phones include the possibility of associating the phone numbers saved in the electronic phone memo of the mobile phone with a distinctive ring tone for each phone number or group of numbers. So the recipient of the call can identify the caller or the group at once on the basis of the ring tone.

In addition to the ring tones that are already saved in the phone, it is possible to order more different ring tones to the mobile phone. Ordering ring tones takes place by sending an order message to a service provider producing ring tones, after which the service provider sends the ring tone to the orderer's mobile phone as a text message. Although there is a large number of service providers offering ring tones, it is often difficult to find an individual and really distinctive ring tone. In addition, the service providers usually charge for the ring tones ordered from them.

The user of a mobile phone can also compose an individual piece of music and save it as the ring tone of the mobile phone. However, composing a ring tone of one's own is difficult and requires musical skill and experience from the user of the phone. In addition, for composing a ring tone of one's own, the user of the phone must have an application program suited for the purpose.

Some mobile phones also have audio recording capability. Then the user of the phone can record the desired tone in the memory of the mobile phone and set it as the ring tone of the phone. In addition, the phone memos of some mobile phones provide the possibility of adding an image or graphical animation in connection with the cell phone number of a person or a group, in which case the image or graphical animation appears on the display of the phone when the person or member of the group in question calls. So, using this combination, it is possible to create a call identifier including image and sound in mobile phones. However, this requires combining measures performed separately by the user of the phone.

In addition, the call identifier obtained as a result of combining images and audio files formed separately often has a clumsy appearance and no personal touch.

The purpose of the invention is to provide a method for forming a personal and distinctive, audiovisual call identifier in a mobile communication device, such as a mobile phone, and a mobile communication device and a call identifier, by which the drawbacks of the prior art can be reduced.

The objects of the invention are achieved by a method, a mobile communication device and a call identifier, which are characterized in what is set forth in the independent claims. Some preferred embodiments of the invention are presented in the dependent claims.

In the method according to the invention, an audiovisual call identifier comprising image and sound is formed for a mobile communication device. The call identifier is repeated on the display and loudspeaker of the communication device when the call arrives, i.e. it functions in the same way as an ordinary ring tone. The first step in the method is to take a shot comprising moving image and sound by a video camera. The shot taken is saved in the memory of the mobile communication device as a video clip and set as the call identifier of the communication device.

In a preferred embodiment of the invention, the video clip is taken by a video camera included in the mobile communication device.

In another preferred embodiment of the invention, the video clip is taken by a separate video camera not belonging to the mobile communication device, and transferred to the memory of the communication device by some data transfer means.

In a third preferred embodiment of the invention, the call identifier is associated with a phone number or numbers in the phone memo of the mobile communication device, in which case the video clip is repeated on the display and loudspeaker of the mobile communication device when the call arrives from the phone number or numbers.

In a fourth preferred embodiment of the invention, the call identifier or a part thereof is repeated on the display of the mobile communication device as notification of a call arrived in the communication device, which has not been answered.

In that case, the call has arrived from the phone number associated with the call identifier.

The invention has the advantage that forming a call identifier including image and sound takes place quickly and easily and does not require special skills.

In addition, the invention has the advantage that the call identifier according to the invention is always original and individual, which makes it easier to identify the caller associated with the call identifier.

A further advantage of the invention is the fact that it increases the choices available to the user of the mobile communication device and improves the possibilities of the user of the communication device to modify the properties of the communication device in the desired manner.

Figure 2:
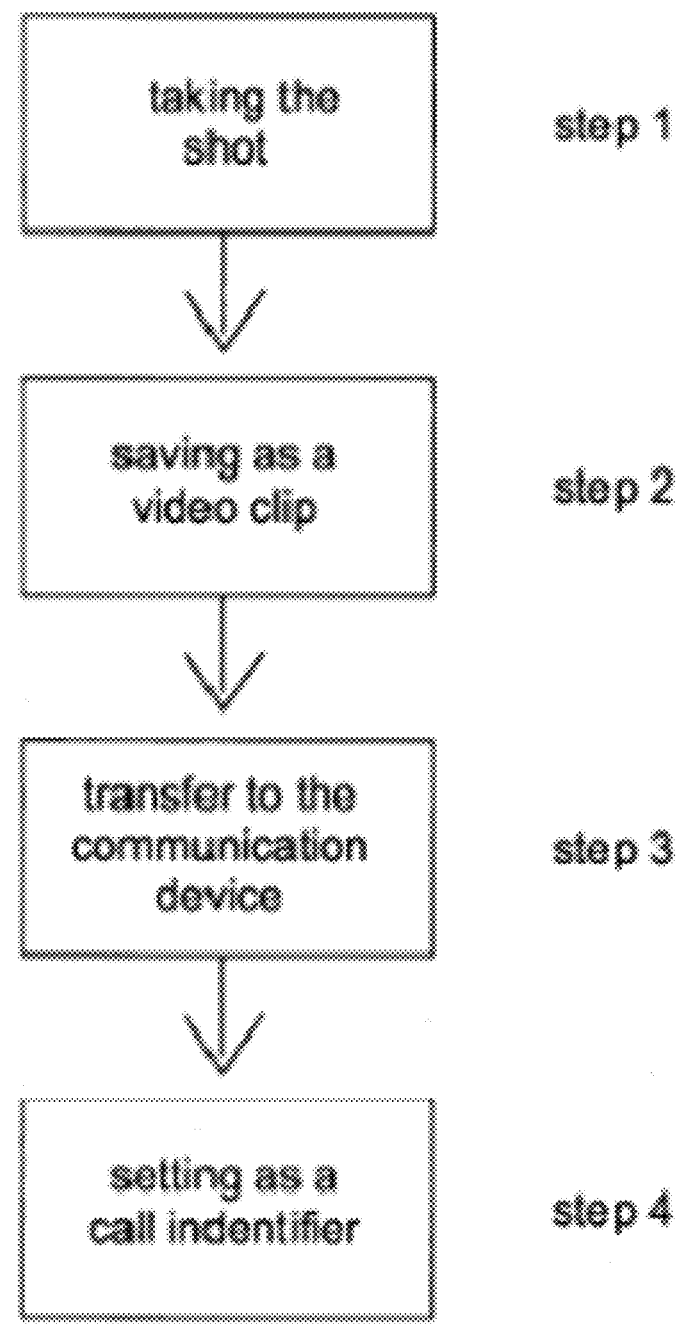

In the following, the invention will be described in more detail. Reference will be made to the accompanying drawings, in which FIG. 1 shows, by way of example, a mobile communication device according to the invention from the front and a schematic diagram of a part of the internal structure of the communication device, and FIG. 2 is a diagram of the different steps of the method according to the invention.

The mobile communication device according to the invention, such as a mobile phone, has, in the known manner, a selection of different ring tones, which the user of the phone can select as notification of an incoming call. In addition to these, the mobile communication device 100 according to the invention provides the possibility of informing the user of the phone of the incoming call by an audiovisual call identifier 200, which comprises moving image and sound. The moving image is presented on the display 102 of the communication device, and the sound is made audible through the loudspeaker 104 of the communication device. If the mobile communication device has been set in the mute alarm mode, the sound belonging to the call identifier is then naturally not heard in the call situation.

In the invention, the audiovisual call identifier 200 has been filmed by a video camera 110 and saved in the memory 106 of the mobile communication device as an electronic video clip 108. The video camera is preferably a fixed part of the communication device, like in the case shown by FIG. 1. In the communication device shown by FIG. 1, the lens of the video camera is located on the rear surface of the device and is therefore drawn with a broken line. The video camera in connection with the communication device is always usable by the carrier of the communication device, which makes it easy to film and save a call identifier also in suddenly appearing and spontaneous situations. However, the video camera can also be a separate device not belonging to the communication device. The separate filming device need not be an actual video camera, but it can also be some other device suited for saving shots containing moving image and sound, such as a digital camera with the capability of taking video clips. Then the call identifier is filmed by a separate device and transferred by some suitable data transfer means to the memory of the communication device. Saving the call identifier 200 electronically in the memory 106 of the communication device 100 naturally requires that the video clip is in digital form. A suitable digital saving format is selected on the basis of the saving properties of the video camera and the reproduction properties of the communication device. Possible digital saving formats are then, for example, saving formats with the file endings .avi, .mov, .mpg, .mpeg, .rm and .asf.

The user of the mobile communication device can use the audiovisual call identifier 200 saved in the memory of the phone in a similar manner as the conventional ring tones. This means that the user can set the call identifier according to the invention as a general alarm sign informing of an incoming call, or the call identifier can be associated with a certain phone number 114 or a group of numbers, which have been saved in the phone memo 112 in the memory 106 of the communication device. Then the communication device informs of the incoming call by a call identifier according to the invention only when the call comes from a phone number or numbers associated with the call identifier.

In a preferred embodiment of the invention, a mobile communication device has been provided with a property by which the user of the communication device is informed of the unanswered calls by a call identifier according to the invention. In this embodiment, the communication device shows the phone number 114 of the person who made the call that remained unanswered, or instead of the name of the caller, the call identifier associated with the phone number. In this case, the call identifier is advantageously repeated only visually on the display of the communication device without a sound from the loudspeaker. Instead of an entire call identifier, it is also possible to repeat a shorter part of it, preferably only one freeze frame.

FIG. 2 shows the different steps of the method according to the invention as a simple diagram. In step 1 of the method according to the invention, a shot containing moving image and sound is first taken by using the ordinary video imaging technique. In step 2, this shot is saved in digital form as a video clip 108 on an electronic storage medium. When a digital imaging device is used, the saving according to step 2 takes place simultaneously with the imaging without separate measures. In step 3, the video clip is transferred from the storage medium to the memory 106 of the mobile communication device, in which it is set in step 4 as a call identifier 200 functioning in the same way as the conventional ring tones. In a preferred embodiment of the invention, the video clip is taken by a video camera 110 in the communication device, which saves the video clip directly into the memory of the communication device. In that case, a separate storage medium is naturally not required. The audiovisual call identifier saved in the memory of the communication device is handled in the communication device in the same way as a conventional ring tone.

In the method according to the invention, it is also possible to use ready-made video clips, which have been saved on some electronic storage medium. So, the video clips can be taken by a different person than the user of the mobile communication device. The user of the mobile communication device can thus, for example, find a suitable video clip from the Internet by a browser and set it as the call identifier of the communication device. It is also possible to use a video clip received by the communication device as the call identifier. The received video clip can be ordered from a commercial service provider or it can be sent by some other person.

Some preferred embodiments of the method, mobile communication device and call identifier according to the invention have been described above. The invention is not limited to the solutions described above, but the inventive idea can be applied in numerous ways within the limits set by the claims.

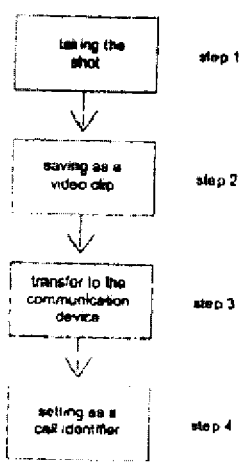

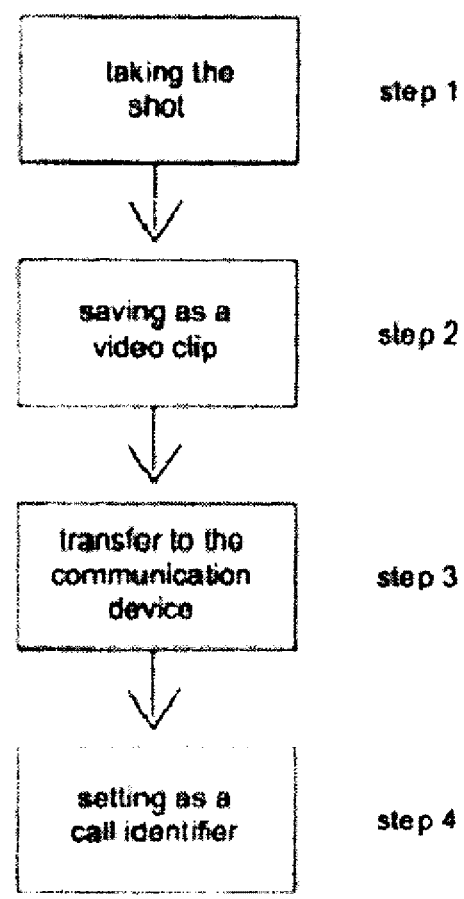

The invention claimed is:

1. A method, comprising:
   determining a call identifier by associating a video clip stored on a mobile device with a phone number stored on the mobile device;
   in response to receiving a call from the phone number associated with the call identifier:
      displaying a video portion of the video clip on a screen of the mobile device; and
      playing an audio portion of the video clip on a speaker of the mobile device; and
   in response to an unanswered call from the phone number associated with the call identifier:
      displaying at least the video portion of the video clip on the screen of the mobile device without playing the audio portion of the video clip on the speaker of the mobile device.

2. The method of claim 1, further comprising capturing the video clip using the mobile device.

3. The method of claim 1, further comprising receiving the video clip from a device external to the mobile device.

4. The method of claim 3, further comprising receiving the video clip as a text message on the mobile device.

5. The method of claim 1,
   wherein determining the call identifier further comprises associating the video clip stored on the mobile device with another phone number stored on the mobile device; and
   wherein in response to receiving the call from the another phone number:
      displaying the video portion of the video clip on the screen of the mobile device;
      playing the audio portion of the video clip on the speaker of the mobile device.

6. The method of claim 1, wherein the video portion of the video clip comprises a freeze frame.

7. A device, comprising:
   a memory device configured to store video; and
   a processing device configured to:
      associate the video stored in the memory device with a phone number stored in the memory device;
      in response to receiving a call from the phone number associated with the video, display a portion of the video on a screen of the device and audibly reproduce audio associated with the portion of the video on a speaker of the device; and in response to an unanswered call from the phone number, display the portion of the video on the screen of the device without audibly reproducing the audio associated with the portion of the video on the speaker of the device.

8. The device of claim 7, wherein the processing device is further configured to enable capturing the portion of the video using the device.

9. The device of claim 7, wherein the processing device is further configured to receive the portion of the video from a source external to the device.

10. The device of claim 9, wherein the processing device is further configured to receive the portion of the video as a text message.

11. The device of claim 7, wherein the processing device is further configured to:
associate the portion of the video with a second phone number stored in the memory device; and
in response to receiving the call from the second phone number, display the portion of the video on the screen of the device and audibly reproduce the audio associated with the portion of the video on the speaker of the device.

12. The device of claim 7, wherein the portion of the video comprises a freeze frame image and corresponding sound contained within the video.

13. A device, comprising:
memory means configured to store a video; and
processing means configured to:
associate the video with a phone number stored in the memory means;
in response to a call from the phone number associated with the video, display at least a portion of the video on a screen of the device and audibly reproduce audio associated with the at least the portion of the video on a speaker of the device; and
in response to an unanswered call from the phone number, display the at least the portion of the video on the screen of the device without audibly reproducing the audio associated with the at least the portion of the video on the speaker of the device.

14. The device of claim 13, wherein the processing means is further configured to capture the at least the portion of the video using the device.

15. The device of claim 13, wherein the processing means is further configured to receive the at least the portion of the video from a source external to the device.

16. The device of claim 15, wherein the processing means is further configured to receive the at least the portion of the video as a text message.

17. The device of claim 13, wherein the processing means is further configured to:
associate the at least the portion of the video with a second phone number stored in the memory means; and
in response to the call originating from the second phone number, display the at least the portion of the video on the screen of the device and audibly reproduce the audio associated with the at least the portion of the video on the speaker of the device.

18. A computer readable storage device including executable instructions stored thereon that configure a processing device to perform operations comprising:
associating a video stored on a mobile device with a phone number stored on the mobile device;
in response to receiving a call from the phone number associated with the video:
displaying a moving image portion of the video on a screen of the mobile device; and
playing an audio portion of the video on a speaker of the mobile device; and
in response to not answering the call from the phone number associated with the call identifier:
displaying the moving image portion of the video on the screen of the mobile device without playing the audio portion of the video on the speaker of the mobile device.

19. The computer readable storage device of claim 18, wherein the processing device is configured to perform operations further comprising:
capturing the video using the mobile device.

20. The computer readable storage device of claim 18, wherein the processing device is configured to perform operations further comprising:
receiving the video from a device external to the mobile device.

21. The computer readable storage device of claim 20, wherein the processing device is configured to perform operations further comprising:
receiving the video as a text message from the device external to the mobile device.

22. The computer readable storage device of claim 18, wherein the processing device is configured to perform operations further comprising:
associating the video stored on the mobile device with another phone number stored on the mobile device; and
in response to receiving the call from the another phone number:
displaying the moving image portion of the video on the screen of the mobile device; and
playing the audio portion of the video on the speaker of the mobile device.

23. The computer readable storage device of claim 18, wherein the video portion of the video comprises a freeze frame.

* * * * *

UNITED STATES PATENT AND TRADEMARK OFFICE
CERTIFICATE OF CORRECTION

PATENT NO.         : 8,391,850 B2
APPLICATION NO.    : 13/231910
DATED              : March 5, 2013
INVENTOR(S)        : Heikinheimo It is certified that error appears in the above-identified patent and that said Letters Patent is hereby corrected as shown below:

The title page showing the illustrative figure should be deleted to be replaced with the attached title page.

In the Drawings:
Drawing sheet, consisting of Fig. 2, should be deleted to be replaced with the drawing sheet, consisting of Fig. 2, as shown on the attached pages.

In the Specifications:
In Column 1, Line 11, delete "Finish" and insert -- Finnish --, therefor.

In the Claims:
In Column 4, Line 53, in Claim 5, delete "device;" and insert -- device; and --, therefor.

Signed and Sealed this
Eleventh Day of March, 2014

Michelle K. Lee
*Deputy Director of the United States Patent and Trademark Office*

CERTIFICATE OF CORRECTION (continued)

(12) United States Patent
Heikinheimo

(10) Patent No.: US 8,391,850 B2
(45) Date of Patent: *Mar. 5, 2013

(54) METHOD FOR FORMING AN AUDIOVISUAL CALL IDENTIFIER, A MOBILE COMMUNICATION DEVICE AND A CALL IDENTIFIER

(75) Inventor: Hanna Heikinheimo, Espoo (FI)

(73) Assignee: Manor Research, L.L.C., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/231,910

(22) Filed: Sep. 13, 2011

(65) Prior Publication Data

US 2012/0064872 A1    Mar. 15, 2012

Related U.S. Application Data

(63) Continuation of application No. 11/664,372, filed as application No. PCT/FI2005/050316 on Sep. 14, 2005, now Pat. No. 8,045,968.

(30) Foreign Application Priority Data

Oct. 1, 2004 (FI) ................................. 20041277

(51) Int. Cl.
H04M 3/42    (2006.01)

(52) U.S. Cl. ............... 455/415; 455/412.1; 455/412.2; 455/413; 455/146; 455/417; 379/142.01; 379/142.08; 379/88.08; 379/142.1; 379/142.11

(58) Field of Classification Search .... 455/412.1–412.2, 455/413–417; 379/142.01–142.09, 142.1, 379/142.11, 88.21–88.27
See application file for complete search history.

(56) References Cited

U.S. PATENT DOCUMENTS

| | | |
|---|---|---|
| 6,775,463 B1 | 8/2004 | Nooralahiyan et al. |
| 2003/0001882 A1 | 1/2003 | Macer et al. |
| 2003/0100295 A1 | 5/2003 | Sakai et al. |
| 2004/0121818 A1 | 6/2004 | Paakkonen |
| 2008/0261575 A1 | 10/2008 | Heikinheimo |

FOREIGN PATENT DOCUMENTS

| | | |
|---|---|---|
| EP | 1033857 A2 | 9/2000 |
| EP | 1117245 A1 | 12/2000 |
| EP | 1202536 | 5/2002 |
| FR | 2860942 | 4/2005 |
| JP | 2002247206 | 8/2002 |
| JP | 2004201249 | 7/2004 |
| JP | 2004228755 | 8/2004 |
| JP | 2004274494 | 9/2004 |
| KR | 20030056467 | 7/2003 |
| WO | 0079770 | 12/2000 |
| WO | 04056073 | 12/2003 |
| WO | 2004054278 | 6/2004 |
| WO | 2006037850 | 4/2006 |

OTHER PUBLICATIONS

National Board of Patents and Registration of Finland; International Search Report and Written Opinion PCT/FI2005/050316; Nov. 14, 2006; 11 pages.
English translation abstract; JP 2004-214915; Yamaha Corp.; Published Jul. 29, 2004; 1 page.
English translation abstract; JP 2002-064658; Venture Matrix Inc.; Published Feb. 28, 2002; 1 page.

Primary Examiner — Wayne Cai
(74) Attorney, Agent, or Firm — Stolowitz Ford Cowger LLP

(57) ABSTRACT

Disclosed is an audiovisual call identifier including image and sound for a mobile communication device. The call identifier is shown on the display and audibly reproduced through the loudspeaker when a call is received by the communication device.

23 Claims, 2 Drawing Sheets